Figure 3:
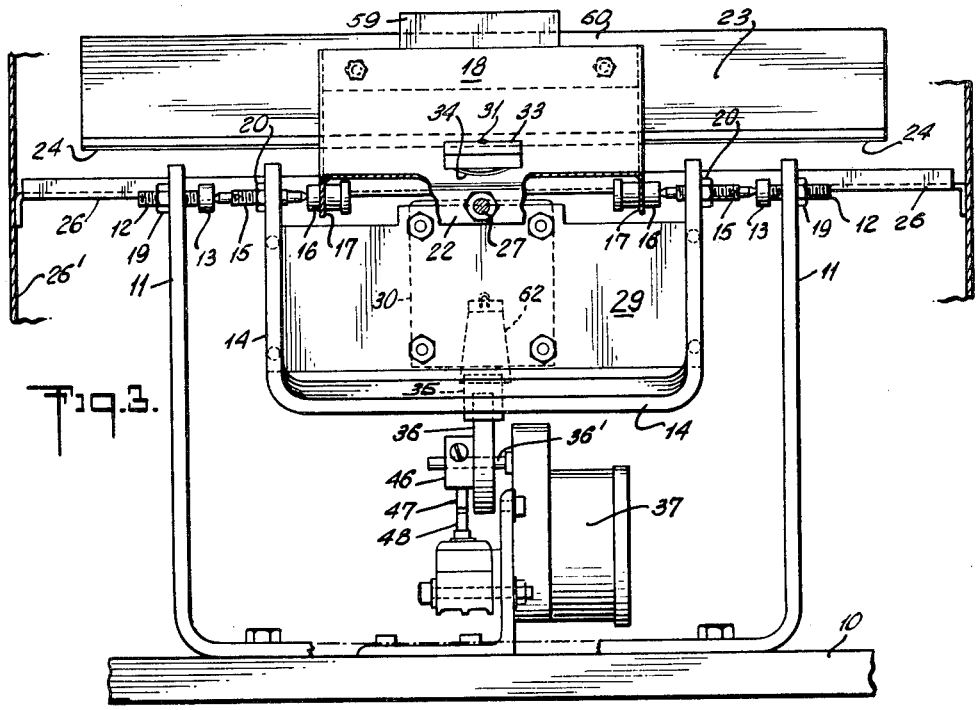

March 27, 1962 E. H. READING 3,026,726
MEASURING DEVICE FOR SOFTNESS TESTER FOR SHEET MATERIAL
Filed Nov. 4, 1957 3 Sheets-Sheet 1
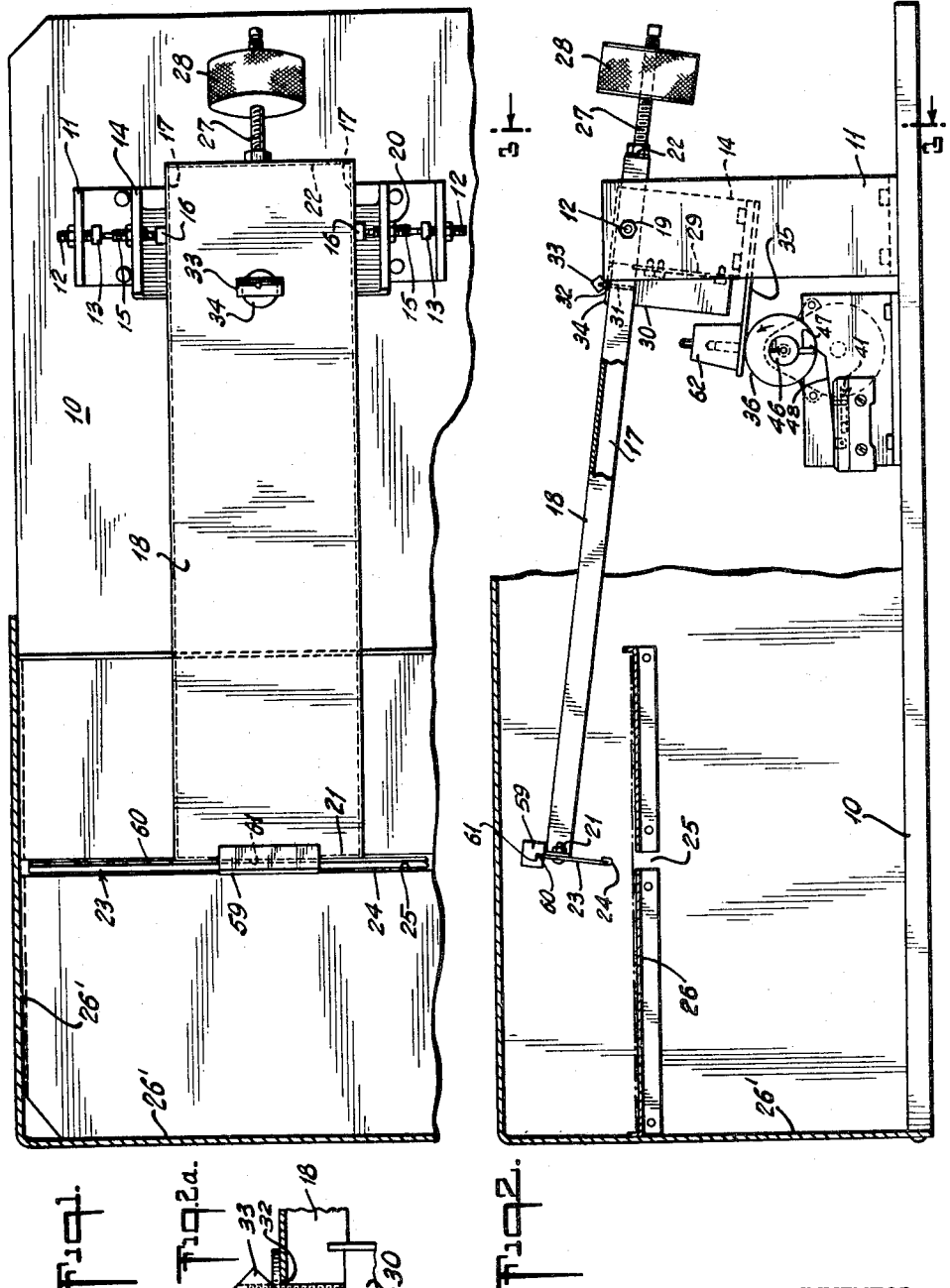
INVENTOR.
EDWARD H. READING
BY
ATTORNEY March 27, 1962 E. H. READING 3,026,726
MEASURING DEVICE FOR SOFTNESS TESTER FOR SHEET MATERIAL
Filed Nov. 4, 1957 3 Sheets-Sheet 2

INVENTOR.
EDWARD H. READING
BY
ATTORNEY

March 27, 1962 E. H. READING 3,026,726
MEASURING DEVICE FOR SOFTNESS TESTER FOR SHEET MATERIAL
Filed Nov. 4, 1957 3 Sheets-Sheet 3

INVENTOR
EDWARD H. READING
BY
ATTORNEY

United States Patent Office 3,026,726
Patented Mar. 27, 1962

3,026,726
MEASURING DEVICE FOR SOFTNESS TESTER
FOR SHEET MATERIAL
Edward H. Reading, Metuchen, N.J., assignor to Personal
Products Corporation, a corporation of New Jersey
Filed Nov. 4, 1957, Ser. No. 694,304
11 Claims. (Cl. 73—159)

This invention relates to devices for measuring the softness or flexibility of sheet material, such as paper or the like. More particularly, this invention relates to improvements in instruments of the type disclosed in U.S. Patent No. 2,718,142 "Softness Tester for Sheet Material" issued September 20, 1955, whereby samples of sheet materials of different widths may be tested and direct comparative readings obtained.

In the above mentioned patent there is disclosed an instrument for determining the softness and flexibility of sheet material such as paper consisting generally of a table which has an aperture of given dimensions which is adapted to be spanned by the sheet material to be tested. A member of given dimensions is movable to push the sheet of material positioned over the aperture into the aperture. The member which so pushes the sheet material is pivotally mounted on a frame rotatable through a fixed angle of rotation. A strain gauge reacting between the member and the frame in which it is pivotally mounted is connected with other devices to indicate the force of resistance presented by the sheet material to the movement of the member through the aperture.

As will be explained further below, the instrument described in the above patent is calibrated and standard sheet material having the desired softness and flexibility is tested to obtain a reading on the electrical devices utilized therein; i.e., a microammeter, which will serve as a standard reading of softness and flexibility. Sheet material of unknown softness and flexibility may then be tested on the instrument and the readings obtained compared to the standard reading established by testing with standard sheet material. If it is desired to test sheet material whose widths differ from the width of the standard material, it is necessary to convert the readings obtained on the tested material to the readings established by the standard sheet material on the basis of their relative widths.

The present invention provides improvements in the measuring devices of such instruments whereby the readings obtained are in direct comparison to the readings established by the standard sheet material without the need for conversion, regardless of the width of the sheet material being tested. This may be accomplished, in accordance with this invention, by providing devices in the electrical measuring circuit of the instrument which permits the instrument to be calibrated so that it may be preset to test samples of sheet material of different widths.

Figure 4:
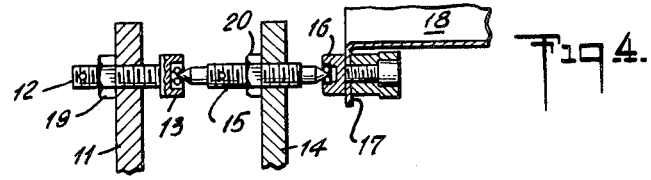
Figure 5:
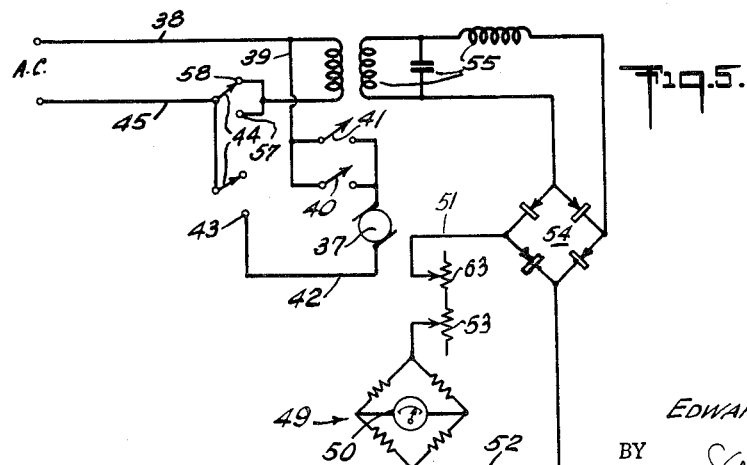
Figure 6:
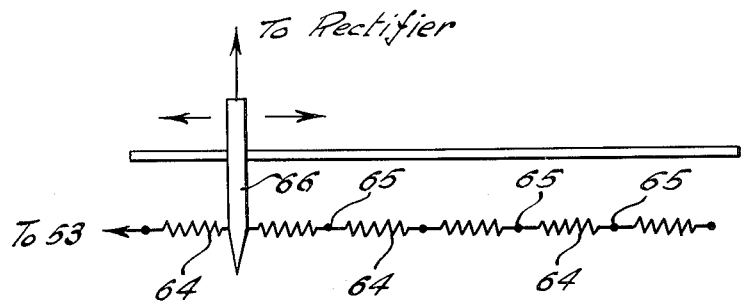
Figure 7:
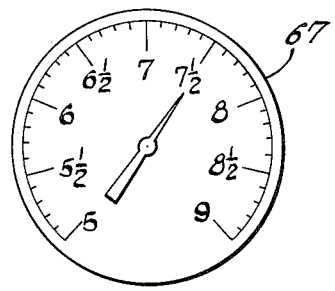

Referring to the accompanying drawings:
FIG. 1 is a top plan view with housing partly removed of a sheet material testing device incorporating the present invention;
FIG. 2 is a side elevation of the operating parts shown in FIG. 1;
FIG. 2a is an enlarged fragmental vertical section through the connection between the beam and the transducer;
FIG. 3 is a transverse vertical section on an enlarged scale on line 3—3 of FIG. 2 looking from the back toward the front of the instrument;
FIG. 4 is an enlarged fragmental section through the pivotal supports for the movable member and its supporting frame;
FIG. 5 is a circuit diagram of the electrically operated element embodying the invention with which the instrument is equiped and of the devices for measuring the forces indicating the softness of the sheet material being tested;
FIG. 6 is a schematic view of one form of a device which may be used in the electrical measuring system in accordance with the invention; and
FIG. 7 is a plan view of an index dial calibrated with reference to a conventional rheostat.

Essentially the instrument which incorporates the present improvements includes a base 10 supporting a fixed pair of laterally spaced vertical standards 11 having near their upper end, in horizontal and coaxial alignment, a pair of studs 12 which present a pair of opposed inwardly facing anti-friction bearings 13 whose function presently will appear (FIGS. 1, 2, 3, and 4). A U-shaped yoke 14 is fulcrumed between the standards 11 by horizontal longitudinally aligned pintles 15 threaded one through each of the spaced legs of the yoke member near their upper ends and whose outer opposed ends engage in the bearings 13. The inner opposed ends of the aligned pintles 15 engage in a pair of outwardly facing anti-friction bearings 16 fixed to lateral flanges 17 depending from a relatively wide plate member 18 constituting a beam which thus is fulcrumed between the legs of the fulcrumed yoke member. The threaded studs 12 which support the bearings in the standards and the threaded pintles 15 permit such adjustments as are required between the bearings and pintles for proper operating efficiency and are held in their positions of adjustment by lock nuts 19 and 20 which may be threaded up tightly against the outer lateral faces of the standards and the yoke respectively.

The lateral depending flanges 17 of the pivoted beam 18 extend throughout the entire length of the beam to insure rigidity and for this purpose, too, the beam is equipped at its opposite ends with similar depending flanges 21, 22 which preferably are joined to the lateral flanges at all four corners of the beam.

As shown most clearly in FIGS. 1 and 2, the beam 18 extends a substantial distance to the left of its fulcrum; i.e., toward the front of the instrument, where it is provided with a transverse blade 23 whose upper portion is fixed to the front vertical flange 21, and whose lower portion which extends substantially beyond the lateral edges of the beam proper, presents a bottom horizontal edge 24 positioned normally to overlie a registering slot 25 in a horizontal table 26 supported by parts 26' preferably fixed to the base 10. The table area is of size sufficient to accommodate flatwise thereon the sheet whose softness is to be tested.

The beam 18 extends for a much shorter distance rearwardly of its fulcrum and to the depending flange 22 at this end, there is fixed a rearwardly extending stud 27 threaded to accommodate a weight 28 which is adjustable by rotation along the stud to counterbalance the weight of that portion of the beam which is in advance of its fulcrum.

A transverse substantially vertical plate 29 is secured to the yoke 14 at the front edges of its upwardly extending legs to support a transducer or strain gauge 30 centrally fixed thereon (FIGS. 2 and 3). The transducer which may be of commercial variety such as that manufactured and sold by Stratham Laboratories, Inc. under designation Model GI, has a stem 31 which extends upwardly from the top of the transducer and which passes through an overlying hole 32 centrally located in the beam 18 somewhat in advance of its fulcrum (see also FIG. 2a). A nut 33 in the form of a square bar and whose threaded hole extends diagonally from one edge of the bar to the other, is screwed on the transducer stem sufficiently tight to engage an underlying washer 34 encircling the stem 31 and which rests on the top surface of the beam. The arrangement of the nut 33 is such that forces (hereinafter referred to)

exerted by the beam on the transducer stem are transmitted through a knife contact; i.e., a corner edge of the nut which is adjusted to lie precisely in a direction transverse of the beam. In the normal position of the parts, i.e., when the blade 23 is in its topmost position, the transducer stem 31 is under some tension, which however, by calibration may be canceled out insofar as the reading of the instrument is concerned. With the beam 18 and the yoke 14 thus interconnected through the transducer 30, any force tending to rotate the beam and the yoke relatively will proportionally strain the transducer.

The U-shaped yoke 14 has fixed to its crossbar a forwardly extending arm 35 which, near its front end, tracks along the peripheral edge of an underlying vertically disposed eccentric 36 fixed on a transverse horizontal shaft 36' projecting laterally from a reduction gear box and driving motor unit 37 mounted on the base 10 and which may be of standard construction (FIGS. 2 and 3). When the arm 35 extending forwardly from the yoke is opposed to the maximum diameter of the eccentric 36, the blade 23 is in its topmost position above the slot 25 in the table 26. However, as the eccentric rotates, the yoke 14 will rock about its fulcrum and cause the beam 18 with its blade 23 to cycle to their lowermost positions as determined by the minimum diameter of the eccentric and then back upwardly to their normal positions as the eccentric completes one revolution.

The motor unit 37 and the transducer 30 are incorporated for operation in an electric circuit illustrated in FIG. 5. The motor is energized from an indicated source of A.C. current through circuit connection including leads 38 and 39, a pair of switches 40 and 41 in parallel, the motor winding, and a lead 42 connected to one pole 43 of a double pole double throw switch 44 and a lead 45 returning to the source. When the switch 44 is closed to make contact through the pole 43, the motor 37 is started by momentarily closing the switch 40. The motor, as it starts, operates to close the other switch 41, which remains closed until one cycle of operation of the eccentric 36 has been completed whereupon the motor is automatically disconnected.

The operation of the cycling switch 41 is best shown in FIGS. 2 and 3. On the shaft of the eccentric, there is fixed a collar 46 having a depending finger 47 which, in the normal position of the parts, depresses pivoted member 48 consisting of an arm and a depending finger which engages an underlying resilient arm carrying one contact of the switch 41 to hold the switch in open position. As the motor is energized, by operation of the momentary switch 40, the finger 47 by rotation of the shaft on which it is mounted releases the arm 48 permitting the cycling switch 41 to close. The cycling switch remains closed until the eccentric has completed one revolution whereupon the finger 47 again depresses the resilient arm 48 to open the switch 41 and disconnect the motor, the momentary switch 40 having been opened in the meantime.

The transducer 30 is connected to form a bridge circuit 49 which in the absence of load applied to the beam 18 causes a microammeter 50 connected across midpoints of the bridge circuit to register zero current. The bridge circuit 49 is supplied with rectified current through leads 51 and 52 and a rheostat 53 from a rectifier 54 which in turn is supplied with alternating current from the A.C. source through a voltage stabilizer 55, the leads 38 and 45 and either pole 57 or 58 of the double pole double throw switch 44 depending upon the position of the latter. The double pole double throw switch 44 permits testing and calibrating the instrument to insure accuracy of operation before actually testing sheet material. Thus when the double pole double throw switch is moved to engage the contact 58 the transducer circuit is energized while the motor circuit remains deenergized.

The instrument hereto described may be calibrated so that each gram of force acting at the end of the beam 18 in a direction to rotate the beam and the yoke relatively in a direction to increase the strain on the transducer and thereby unbalance the bridge circuit, shall give a reading of one microamp on the meter 50. A standard weight 59 weighing 40 grams, by way of example, is removably seated at the end of the beam 18 as by providing it with a recess 60 adapted to receive a raised edge portion 61 on the blade 23. The counterbalance weight 28 at the opposite end of the beam is then adjusted until the meter reads zero microamps. The beam is then in balance with no strain on the transducer stem. The weight 59 is then removed and the rheostat 53 adjusted until the microammeter registers 40 microamps. The return of the weight 59 to its position on the end of the beam will then bring the current reading to zero. The instrument has then been calibrated so the reading of the meter in microamps corresponds to the force in grams exerted on the blade end of the beam and is ready for use.

When the instrument has been adjusted for proper reading when the beam is in normal position (which need only be done at relatively infrequent intervals), the switch 44 is adjusted to close the circuits through the contacts 43 and 57 and render operable both the motor and the transducer circuits. A sheet of material to be tested, say paper, then may be placed on the table 26 across the slot 25 and beneath the blade 23. Upon closing the momentary switch 40, the instrument starts to cycle in the manner previously described to cause the blade edge 24 to move down into engagement with the paper and through the slot pushing the paper ahead of it in the form of a loop, the blade then being returned to its normal position as the instrument completes the cycle. The resistance presented by the paper to the movement of the blade through the slot is reflected by an increase in the strain impressed upon the transducer 30. The proportional unbalance of the bridge circuit 49, which thereby results, gives a reading on the microammeter 50 which in turn is proportional to the softness of the paper undergoing test.

To insure that the yoke 14 in its rocking movement will always follow the eccentric, a weight 62 of any suitable type may be placed upon the yoke extension 35 immediately above the eccentric 36.

Since the strain on the transducer, and the resultant reading on the microammeter is determined by the force required to fold the sheet material into the slot, the greater the width of sheet material tested, the larger the force required, and conversely. Therefore, the microammeter readings obtained on sheets of material having the same softness and flexibility, but different widths, will differ. Accordingly, if it is desired to test samples of sheet material whose widths differ from the width of the standard sheet material, it is necessary to convert the readings obtained on such samples to that established by the standard sheet material on the basis of their relative widths in order that a proper comparison can be made.

As has been explained above, the extent to which the microammeter deflects during testing with the standard sheet material is determined by the manner in which the apparatus is calibrated. Since the microammeter measures the voltage drop across the bridge, the extent of deflection of the microammeter may be varied by varying the potential drop across the Wheatstone bridge. A greater or lesser deflection of the microammeter may be obtained by increasing or decreasing the potential drop across the bridge. If it is desired to cause the microammeter to deflect more or less than forty microamperes, the rheostat is adjusted accordingly. This reading then serves as the standard.

Since the extent of deflection of the microammeter may be controlled in this manner, to test samples whose widths differ from the width of the standard sheet material so as to obtain readings which can be compared directly to the standard reading established by the standard sheet material, it is possible to establish beforehand the potential drop across the bridge required to obtain such readings, and thus eliminate conversion. This may be accomplished by incorporating devices into the electrical measuring circuit for adjusting the potential drop across the bridge. Such devices can then be calibrated by testing sheet material of different widths so that the device can thereafter be preset to the width of the sample to be tested and the apparatus operated in the customary manner.

Suitable devices include a rheostat 63 of conventional form connected to rheostat 53 and rectifier 54 or, as illustrated in FIGURE 6, may consist of a plurality of series connected resistors 64 connected at one end of the series connection to the rheostat 53 and having contacts 65 at their points of connection which may be contacted by a sliding arm pickup 66 connected to the rectifier 54. In this form, each of the individual resistors may vary from an adjacent one according to predetermined increments or, if desired, they may be of equal resistance and used in an additive fashion. In FIGURE 7 there is shown an index card 67 calibrated for use with a circular rheostat and having indicia on its face denoting the position at which the rheostat is to be set to test different widths of sheet material.

The instrument equipped with such a rheostat may be set up for operation in the following manner. Assume, by way of example, that it is desired to calibrate the rheostat 63 so that sheets of material varying in width from seven to nine inches in one-half inch increments may be tested on the instrument. With the rheostat 63 positioned at its lowest setting, i.e., least resistance in the circuit, the instrument, in the manner explained above, is made ready for use and is adjusted for proper reading when the beam is in normal position with the 40 gram weight so that the reading in microamps corresponds to the force in grams exerted on the blade end of the beam, i.e., one gram of force on the end of the beam will cause a one microamp deflection. The rheostat 63 is maintained at its lowest setting and the index card marked at this position with the numeral 7, the low end of the range of widths of sheet material for which the rheostat is to be calibrated. A series of weights are prepared whose weights are equal to the ratio of the width of the sheet material for which the rheostat is to be calibrated to seven, the bottom of the width range, times the weight used to make the instrument ready for use; i.e., the forty gram weight. To calibrate for a sheet 7½ inches wide, the weight used would be 42.86 grams. The 42.86 gram weight is placed on the blade end of the beam in the same manner that the 40 gram weight was positioned to make the instrument ready for use, and the counterbalance on the opposite end of the beam is adjusted until the meter reads zero microamps. The 42.86 gram weight is then removed and the rheostat 63 adjusted until the microammeter deflects 40 microamps. The index card is marked at this setting of the rheostat with the numeral 7½. The rheostat 63 is now calibrated so that a sample of sheet material 7½ inches wide may be tested on the instrument by operating the instrument with the rheostat positioned at the 7½ inch mark on the index card. The reading obtained will be in direct comparison to the reading obtained when sheet material 7 inches wide is tested. Additional weights are then prepared for each sample width desired to be tested and the rheostat calibrated in the above manner. The rheostat may be so calibrated for different ranges of sample widths in any desired increments.

To determine the reading on the microammeter which is to serve as the standard reading to which readings obtained by testing samples of unknown softness are compared, a sheet of standard material in any of the widths for which the rheostat 63 has been calibrated is tested on the instrument. The rheostat is turned to the position on the index card denoting the width of standard sheet material to be tested, the instrument operated and the standard reading obtained on the microammeter.

In calibrating the rheostat, it has been determined that the change in rheostat resistance is essentially linear with the change in width of sheet material. Therefore, it is preferred that a precision rheostat, or its equivalent be used. With a rheostat of this type, it is only necessary to calibrate, as above, for three or four different widths of sheet material; e.g., the maximum width to be tested, the minimum width and two intermediate widths, and the index card marked appropriately for each of the widths tested. Other positions on the card for intermediate widths may then be determined by dividing, in equal increments, the spaces between the positions marked for the widths calibrated. Separate calibration for each width of sheet material which may be tested is not required.

It is apparent that various changes may be made from the foregoing illustrative examples without departing from the invention.

What is claimed is:

1. In an instrument for testing flexible sheet material for softness having a strain gauge as a component thereof for measuring the softness reacted by a specimen-engaging member adapted to engage the entire width of the sheet material to be tested, electrical devices for measuring the force on said strain gauge including a bridge circuit controlled by said gauge, a source of current for said bridge circuit, and at least two devices for independently varying the current to said bridge circuit, one of said devices being calibrated for different widths of sheet materials to be tested.

2. In an instrument for testing flexible sheet material for softness having a strain gauge as a component thereof for measuring the softness reacted by a specimen-engaging member adapted to engage the entire width of the sheet material to be tested, electrical devices for measuring the force on said strain gauge including a bridge circuit controlled by said gauge, a source of current for said bridge circuit, means for balancing said circuit, and adjustable devices for varying the current to said bridge circuit, one of said devices being calibrated for different widths of sheet materials to be tested.

3. In an instrument for testing flexible sheet material for softness having a strain gauge as a component thereof for measuring the softness reacted by a specimen-engaging member adapted to engage the entire width of the sheet material to be tested, electrical devices for measuring the force on said strain gauge including a Wheatstone bridge controlled by said gauge, a source of current for said bridge, and two variable series connected devices for varying the current to said bridge, one of said devices being calibrated for different widths of sheet materials to be tested.

4. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force on the strain gauge including a bridge circuit, a source of current for said bridge circuit, means for balancing said bridge circuit, and adjustable devices for varying the current to said bridge circuit, one of said devices being calibrated for different widths of sheet materials to be tested.

5. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, means for measuring said force of resistance including electrical devices for translating said force of resistance into measurable electrical components, a source of current for said electrical devices, and plural variable means in series for varying said current to said electrical devices one of said means being calibrated for different widths of sheet materials to be tested.

6. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force of resistance including a bridge circuit having the strain gauge as a component thereof, a source of current for said bridge circuit, and at least two devices for independently varying said current to said bridge circuit, one of said devices being calibrated for different widths of sheet materials to be tested.

7. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force of resistance, including a Wheatstone bridge, controlled by said strain gauge a source of current for said bridge, and plural variable devices in series for varying said current to said bridge one of said devices being calibrated for different widths of sheet materials to be tested.

8. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force of resistance including a Wheatstone bridge having the strain gauge as a component thereof, a source of current for said bridge, and devices plural variable in series for varying said current to said bridge one of said devices being calibrated for different widths of sheet materials to be tested.

9. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and devices for measuring said force of resistance including a Wheatstone bridge controlled by said strain gauge, a source of current for said bridge, and two variable devices in series for varying said current to said bridge one of said devices being calibrated for different widths of sheet materials to be tested.

10. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force of resistance including a Wheatstone bridge controlled by said strain gauge, a source of rectified current for said bridge, and two rheostats in series for varying said current to said bridge, one of said rheostats being calibrated for different widths of sheet materials to be tested.

11. An instrument for testing flexible sheet material for softness comprising a table having an aperture of given dimensions therein adapted to be spanned by a sheet of material to be tested, a member having dimensions adapted to engage the entire width of the sheet material to be tested and movable to push said sheet of material so positioned into the aperture, a frame in which said member is pivotally mounted, means for rotating the frame through a fixed angle of rotation to effect such movement of the member, a strain gauge reacting between the member and the frame in which it is pivotally mounted for indicating the force of resistance presented by the sheet material to the movement of the member through the aperture, and electrical devices for measuring said force of resistance including a Wheatstone bridge controlled by said strain gauge, a source of current for said bridge, and a first rheostat for balancing the bridge, and a second rheostat in series therewith for varying said current to said bridge, said second rheostat being calibrated for different widths of sheet materials to be tested.

References Cited in the file of this patent

UNITED STATES PATENTS

| | | |
|---|---|---|
| 2,389,615 | Eder | Nov. 27, 1945 |
| 2,718,142 | Schwartz et al. | Sept. 20, 1955 |

UNITED STATES PATENT OFFICE
CERTIFICATE OF CORRECTION

Patent No. 3,026,726              March 27, 1962

Edward H. Reading

It is hereby certified that error appears in the above numbered patent requiring correction and that the said Letters Patent should read as corrected below.

Column 8, line 5, for "devices plural variable" read -- plural variable devices --.

Signed and sealed this 11th day of December 1962.

(SEAL)
Attest:

ERNEST W. SWIDER
Attesting Officer

DAVID L. LADD
Commissioner of Patents